US010021339B2

(12) United States Patent
Kim et al.

(10) Patent No.: US 10,021,339 B2
(45) Date of Patent: Jul. 10, 2018

(54) ELECTRONIC DEVICE FOR GENERATING VIDEO DATA

(71) Applicant: QUALCOMM Incorporated, San Diego, CA (US)

(72) Inventors: Taesu Kim, Suwon (KR); Sungrack Yun, Seongnam (KR); Min-Kyu Park, Seoul (KR); Heeman Kim, Seongnam (KR)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 14/956,252

(22) Filed: Dec. 1, 2015

(65) Prior Publication Data

US 2017/0201714 A1    Jul. 13, 2017

(51) Int. Cl.
*H04N 5/911* (2006.01)
*H04N 7/18* (2006.01)
*H04N 5/77* (2006.01)
*H04N 9/802* (2006.01)
*H04N 5/265* (2006.01)
*H04R 3/00* (2006.01)
B64C 39/02 (2006.01)
G10L 21/0208 (2013.01)
G10L 21/034 (2013.01)

(52) U.S. Cl.
CPC ............. *H04N 5/911* (2013.01); *H04N 5/265* (2013.01); *H04N 5/77* (2013.01); *H04N 7/185* (2013.01); *H04N 9/802* (2013.01); *H04R 3/005* (2013.01); *B64C 39/024* (2013.01); *B64C 2201/123* (2013.01); *G10L 21/0208* (2013.01); *G10L 21/034* (2013.01)

(58) Field of Classification Search
None
See application file for complete search history.

(56) References Cited

U.S. PATENT DOCUMENTS 8,948,935 B1    2/2015    Peeters et al.
2010/0096490 A1    4/2010    Gordon
(Continued)

FOREIGN PATENT DOCUMENTS

WO    2014106814 A2    7/2014

OTHER PUBLICATIONS

Klapel J., "Acoustic Measurements with a Quadcopter," Embedded Computing Systems, Jun. 2014, 123 Pages.
(Continued)

*Primary Examiner* — James M Anderson, II
(74) *Attorney, Agent, or Firm* — Qualcomm Incorporated-Toler

(57) ABSTRACT

An electronic device for generating video data is disclosed. The electronic device may include a communication unit configured to wirelessly receive a video stream captured by a camera, wherein the camera is located in an unmanned aerial vehicle. The electronic device may also include at least one sound sensor configured to receive an input sound stream. In addition, the electronic device may include an audio control unit configured to generate an audio stream associated with the video stream based on the input sound stream. Further, the electronic device may include a synthesizer unit configured to generate the video data based on the video stream and the audio stream.

30 Claims, 11 Drawing Sheets

(56) References Cited

U.S. PATENT DOCUMENTS

| | | | |
|---|---|---|---|
| 2012/0257036 A1* | 10/2012 | Stenberg | G03B 31/00 |
| | | | 348/78 |
| 2012/0262708 A1* | 10/2012 | Connolly | B64C 39/024 |
| | | | 356/237.2 |
| 2015/0062339 A1 | 3/2015 | Ostrom | |
| 2015/0063202 A1 | 3/2015 | Mazzarella et al. | |
| 2016/0336020 A1* | 11/2016 | Bradlow | G01S 19/49 |
| 2017/0053674 A1* | 2/2017 | Fisher | H04N 21/84 |
| 2017/0148328 A1* | 5/2017 | Chan | G08G 5/006 |

OTHER PUBLICATIONS

International Search Report and Written Opinion—PCT/US2016/058910—ISA/EPO—dated Jul. 7, 2017.
phantom filters.com: "How to make YouTube Live-streaming work", DJI Forum, XP02771467, May 8, 2015 (May 8, 2015), Retrieved from the Internet: URL: http://forum.dji.com/thread-14421-1-1.html [retrieved on Jun. 27, 2017].

* cited by examiner

ELECTRONIC DEVICE FOR GENERATING VIDEO DATA

FIELD OF THE DISCLOSURE

The present disclosure relates generally to generating video data in an electronic device, and more specifically, to generating video data using an unmanned aerial vehicle equipped with a camera.

DESCRIPTION OF RELATED ART

Unmanned flying objects such as drones are becoming increasingly popular for both industries and consumers. Conventional drones have been used to provide various services such as delivery of consumer goods, delivery of medical services, surveillance services, etc. In addition, such drones often provide video capabilities to capture videos of desired scenes and objects.

To provide such video functionalities, conventional drones are typically equipped with a video camera to record images of a scene or objects. Further, such video camera may record sound while recording the images. For example, a user may use a controller to pilot a drone to capture a video of a desired scene. In addition, the video camera may also capture sound while capturing the video.

However, the sound recorded by the video camera in conventional drones may include substantial amount of noise such as engine or propeller noise, wind noise, or the like, which may degrade the quality of the captured sound. Further, such drones are often located at a distance while capturing a video of a scene. Thus, the video camera may not be able to capture sound of sufficient quality due to such external noise and distance between the drone and the scene. On the other hand, using only the recorded images without the recorded sound may not provide a realistic audio-visual experience for viewers.

SUMMARY OF THE INVENTION

The present disclosure provides generating video data of a target scene by synchronously combining the video stream captured by the unmanned aerial vehicle and the audio stream associated with the target scene received from the sound sensors of an electronic device.

According to one aspect of the present disclosure, an electronic device for generating video data is disclosed. The electronic device may include a communication unit, at least one sound sensor, an audio control unit and a synthesizer unit. The communication unit may be configured to wirelessly receive a video stream captured by a camera, where the camera is located in an unmanned aerial vehicle. In addition, at least one sound sensor may be configured to receive an input sound stream. Further, the audio control unit may be configured to generate an audio stream associated with the video stream based on the input sound stream. In addition, the synthesizer unit may be configured to generate the video data based on the video stream and the audio stream. The disclosure also describes a method and a computer-readable medium relating to this electronic device.

According to another aspect of the present disclosure, a method for generating video data in an electronic device is disclosed. The method may include wirelessly receiving, by a communication unit, a video stream captured by a camera, where the camera is located in an unmanned aerial vehicle. The method may also include receiving, by at least one sound sensor, an input sound stream. The method may also include generating, by a processor, an audio stream associated with the video stream based on the input sound stream. The method may also include generating, by the processor, the video data based on the video stream and the audio stream.

BRIEF DESCRIPTION OF THE DRAWINGS

Embodiments of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
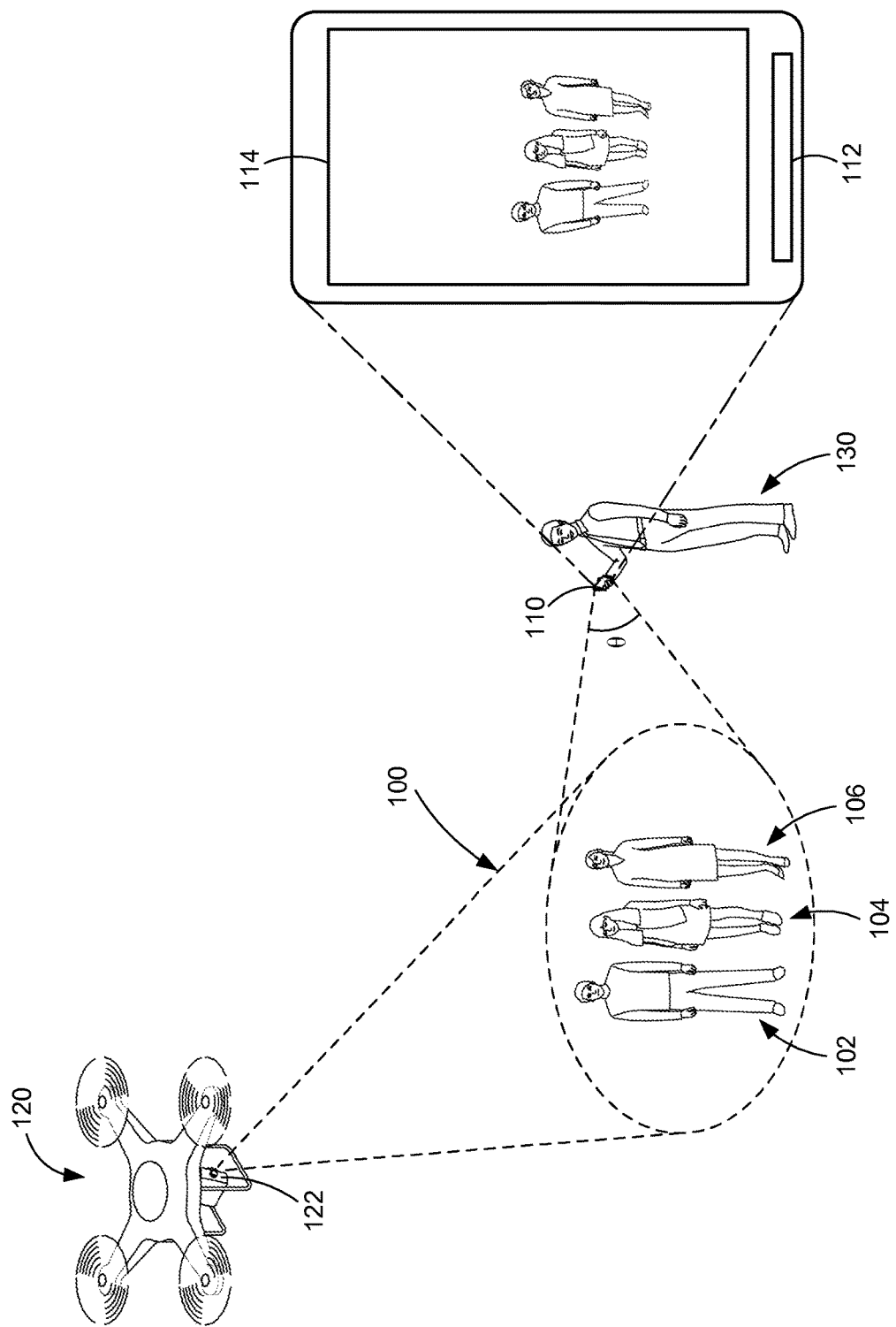
FIG. 1 illustrates an electronic device configured to generate video data of a target scene based on a video stream received from an unmanned aerial vehicle and an input sound stream received by the electronic device, according to one embodiment of the present disclosure.

FIG. 1 illustrates an electronic device 110 configured to generate video data of a target scene 100 based on a video stream received from an unmanned aerial vehicle (UAV) 120 and an input sound stream received by the electronic device 110, according to one embodiment of the present disclosure. As used herein, the term "UAV" refers to an aircraft, a drone, or a flying robot that can fly autonomously and/or under remote control without an on-board pilot and may include any suitable unmanned flying vehicles, remotely piloted aircraft, unmanned aircraft, remotely operated aircraft, and the like. For example, a UAV may be a helicopter, a quadcopter, a smart copter, an airplane, or a glider that may be operated autonomously or under remote control of an operator and may employ a software-controlled navigation scheme based on any suitable navigation methods such as a global positioning system (GPS), a remote sensing technology (e.g., laser, radar, etc.), and/or the like. As used herein, the term "input sound stream" may refer to a sequence of one or more sound signals or sound data received by or from one or more sound sensors (e.g., one or more microphones). Further, the term "target scene" may refer to a scene captured within an angle of view of a camera 122 of the UAV 120 and may change according to a direction of the camera, camera parameters (e.g., a focal length, aperture, and the like), and/or movement of the UAV 120.

In the illustrated embodiment, the UAV 120 may be a quadcopter or a drone equipped with a camera 122 mounted or disposed thereon. As described herein, the term "camera" may refer to any suitable image sensing device that can capture or acquire a sequence of images and may further include one or more sound sensors 112 (e.g., one or more microphones) capable of capturing or acquiring a sequence of surrounding sound associated with the sequence of images. For example, the camera 122 may be a digital camera, a camcorder, a video camera, or a webcam equipped with one or more microphones. Additionally or alternatively, the one or more sound sensors may be provided in the UAV 120 separate from the camera 122 to capture sound associated with the sequence of images.

The UAV 120 may be wirelessly controlled and/or piloted by the electronic device 110. Additionally or alternatively, the UAV 120 may be piloted autonomously during any portion of a trip to and from a destination. As used herein, the electronic device 110 may be any suitable device capable of receiving and processing video and audio data and may include a smartphone, a laptop computer, a wearable computer, a tablet computer, a controller console, or the like. For example, the electronic device 110 may be a smartphone of a user 130 and include the one or more sound sensors 112 configured to receive the input sound stream.

The UAV 120 and the electronic device 110 may be configured to wirelessly communicate with each other using any suitable wireless communication schemes such as Wi-Fi, WiMAX, Bluetooth, or any other wireless communication technologies such as 4G and 5G wireless technologies. For example, the UAV 120 and the electronic device 110 may communicate using a wireless communication scheme based on any suitable radio wave frequencies (e.g., 2.4 gigahertz). In one embodiment, the electronic device 110 may be operated by the user 130 to communicate wirelessly to pilot the UAV 120 and/or control operation of the camera 122 in the UAV 120. For example, the electronic device 110 may be used to adjust camera parameters such as a focal length (angle or field of view) and a direction of a lens in the camera 122.

As shown in FIG. 1, the user 130 may operate the electronic device 110 to pilot the UAV 120 equipped with the camera 122 to or toward a desired location and control the camera 122 in the UAV to capture a video stream of the target scene 100, which may be located on land or a structure (e.g., a building, a platform, etc.). As used herein, the term "video stream" refers to a plurality of video frames that may include a sequence of images (e.g., image frames) and may further include a sequence of sound segments (e.g., audio frames) corresponding to the sequence of images. In the illustrated embodiment, the target scene 100 may include a plurality of persons 102, 104, 106. While capturing the video stream of the target scene 100, the UAV 120 may be stationary at a distance from the target scene 100 or moving toward or away from the target scene 100. The target scene 100 including the persons 102 to 106 may be located within an audible range of the sound sensors 112 in the electronic device 110. Although the target scene 100 including the persons 102 to 106 is illustrated herein, the camera 122 in the UAV 120 may capture any desired target scene that is different from the target scene 100 or include different objects.

As the video stream of the target scene 100 is being captured by the camera 122, the UAV 120 may wirelessly transmit the captured video stream (e.g., a plurality of video frames) as well as camera parameters and location information associated with the video stream to the electronic device 110. As used herein, the term "camera parameters" may refer to any variables or constant that may describe or indicate an operating condition of a camera and may include a focal distance, ISO, shutter speed, aperture, an angle of view of the camera, a frame rate of video and/or audio frames, timestamps of the video and audio frames, and/or the like. The term "location information" may refer to any data describing or indicating a location or orientation of an object such as a UAV, an electronic device, or the like, and may include a coordinate, a tilt/orientation, speed, acceleration, altitude, and/or a relative distance to another object of the object, or any one or combination thereof.

While the video stream of the target scene 100 is being captured by the camera 122, the sound sensors 112 in the electronic device 110 may receive the input sound stream, which may include sounds from the target scene 100 and outside the target scene 100. As the video stream of the target scene 100 and the associated camera parameters and location information are received from the UAV 120, the electronic device 110 may determine an audio beamforming angle θ indicative of or corresponding to the target scene 100 based on the camera parameters and location information. In this case, the audio beamforming angle θ indicative of or corresponding to the target scene 100 may be determined relative to a reference direction of the electronic device 110 such as a direction defined by the sound sensors 112 in the electronic device 110. In one embodiment, the sound sensors 112 may be any type of sensors (e.g., a plurality of microphones) that can be used to receive, capture, sense, and/or detect sound employing any suitable software and/or hardware for performing such functions.

Upon determining the audio beamforming angle θ with respect to the reference direction of the electronic device 110, the electronic device 110 may selectively extract an audio stream associated with the target scene 100 from the input sound stream based on the audio beamforming angle θ. As used herein, the term "audio stream" may refer to a sequence of sound signals or sound data indicative of or associated with sounds received from a target scene, and may be associated with the video stream of the target scene 100 captured by the camera 122 in the UAV 120. In one embodiment, the electronic device 110 may extract the audio stream from the input sound stream by performing a suitable beamforming operation on the input sound stream based on the audio beamforming angle θ.

The audio stream associated with or received from the target scene 100 may be combined synchronously with the received video stream (e.g., the plurality of video frames) of the target scene 100 to generate video data of the target scene 100. The generated video data of the target scene 100 may then be displayed on a display screen 114 of the electronic device 110. Although the video data is described as being generated from the video stream and the audio stream substantially in real time, the video data may also be generated after receiving any portion or portions of the video stream and audio stream.

Figure 2:
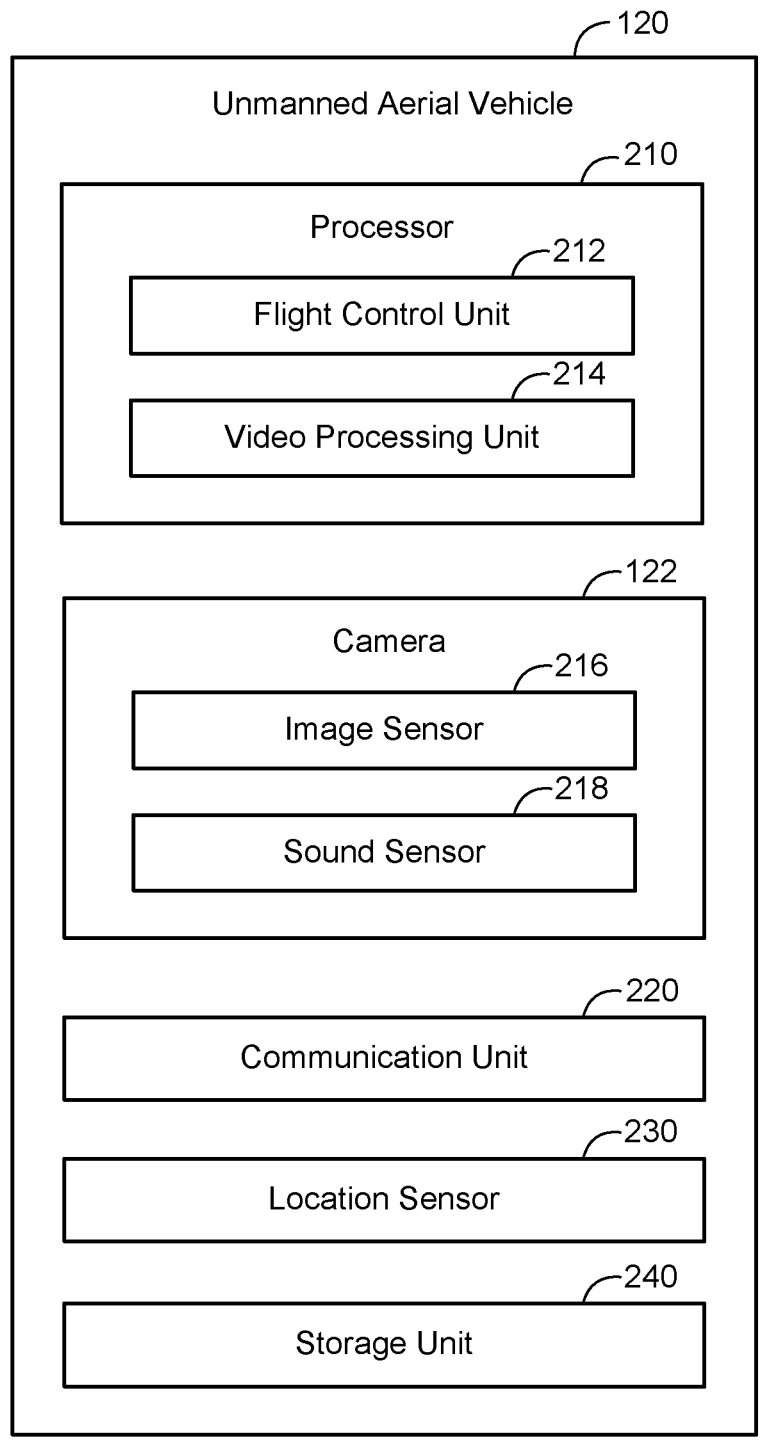
FIG. 2 illustrates a block diagram of the unmanned aerial vehicle configured to capture and wirelessly transmit a video stream of the target scene, according to one embodiment of the present disclosure.

FIG. 2 illustrates a block diagram of the UAV 120 configured to capture and wirelessly transmit a video stream (e.g., a plurality of video frames) of the target scene 100, according to one embodiment of the present disclosure. The UAV 120 may include a processor 210, a camera 122, a communication unit 220, a location sensor 230, and a storage unit 240. The UAV 120 may be configured to communicate wirelessly with the electronic device 110 via the communication unit 220, which may employ any suitable wireless communication scheme such as Wi-Fi, WiMAX, Bluetooth, or any other wireless communication technologies (e.g., 4G, 5G, etc.) capable of wirelessly transmitting data.

The processor 210 may include a flight control unit 212 and a video processing unit 214. The flight control unit 212 may be configured to receive flight instructions from the electronic device 110 via the communication unit 220 and pilot the UAV 120 autonomously or in response to the flight instructions. For example, based on the wirelessly transmitted flight instructions from the electronic device 110, the UAV 120 may move toward or away from the target scene 100 or hover to capture video stream of the target scene 100 through the camera 122.

The camera 122 may include an image sensor 216 and a sound sensor 218 and may be configured to operate automatically or based on camera parameters (e.g., a focal length, a direction, ISO, shutter speed, aperture, etc. of the camera 122) received from the electronic device 110 via the communication unit 220. In one embodiment, the video processing unit 214 in the processor 210 may control the camera 122 to capture a plurality of video frames as the video stream of the target scene 100 automatically or in response to camera parameters received from the electronic device 110 via the communication unit 220. In this case, the image sensor 216 of the camera 122 may capture the video frames of the target scene 100 under an automatic mode or according to the camera parameters received from the electronic device 110. For example, the image sensor 216 may be configured to capture a plurality of images (e.g., image frames) of the target scene 100 within its angle of view (e.g., a field of view).

Upon capturing the images of the target scene 100, the image sensor 216 may provide the images to the video processing unit 214. Further, the images may be stored in the storage unit 240 for access by the video processing unit 214. The image sensor 216 may be any suitable device that can be used to capture, sense, and/or detect a sequence of images of objects or scenes and may include at least one lens and a sensor such as a CMOS sensor or a charge coupled device (CCD).

As the image sensor 216 is capturing the image frames of the target scene 100, the sound sensor 218 of the camera 122 may receive an input sound stream, which may include sound from the target scene 100 and from other directions or sound sources, and output a plurality of audio frames (e.g., audio data frames) corresponding to the image frames to the video processing unit 214. The audio frames may also be stored in the storage unit 240 for access by the video processing unit 214. Although the sound sensor 218 is illustrated within the camera 122, it may be located in any suitable location on the UAV 120. Further, it should be appreciated that the sound sensor 218 may be any type of sensors (e.g., a microphone) that can be used to receive, capture, sense, and/or detect sound employing any suitable software and/or hardware for performing such functions, and may include any number of microphones.

As the images of the target scene 100 and the corresponding audio frames are received, the video processing unit 214 may keep track of camera parameters and location information associated with the images and audio frames captured by the camera 122. In addition, the location information of the UAV 120 at the time of capturing the images and audio frames may be received from the location sensor 230. In one embodiment, the location sensor 230 may be configured to detect a direction of movement, speed of movement, acceleration, a tilt/orientation, and/or a coordinate (e.g., latitude, longitude, and altitude) of the UAV 120, and provide the detected data as location information to the video processing unit 214. For example, the location sensor 230 may employ any number or combination of sensors such as a direction sensor, a gyro sensor, an acceleration sensor (e.g., an accelerometer), a rotation rate sensor, an altimeter, a GPS (global positioning system) receiver, and the like. The location sensor 230 may store the location information in the storage unit 240 for access by the video processing unit 214.

In one embodiment, the video processing unit 214 may tag or link each of the image frames and/or audio frames with a timestamp indicating a time at which the image and audio frames were received or captured by the image sensor 216 and the sound sensor 218, respectively. The video stream tagged with the timestamps may then be provided to the electronic device 110 for use in synchronizing the video stream with the audio stream received from the target scene 100. In another embodiment, a timestamp for a first image frame and a first audio frame of the video stream may be provided to the electronic device 110 as the starting time of the video stream along with a frame rate of the video stream via the communication unit 220. In this case, the electronic device 110 may synchronize the video stream with the audio stream from the target scene 100 based on the starting time of the video stream and the frame rate.

Additionally or alternatively, the electronic device 110 may transmit a start signal to the UAV 120 to control the camera 122 to start capturing the video stream. Simultaneously, the electronic device 110 may start receiving or capturing the input sound stream. The electronic device 110 may subsequently transmit a stop signal to the UAV 120 to control the camera 122 to stop capturing the video stream. At the same time, the electronic device 110 may stop receiving or capturing the input sound stream. As the video stream and the input sound stream are received in response to the start signal, the electronic device 110 may selectively extract the audio stream associated with the target scene 100 from the input sound stream. In one embodiment, the video stream and the audio stream may be synchronized based on the start time associated with the start signal and a frame rate of the video stream and the audio stream.

The storage unit 240 may be configured to store the video stream including the image frames received from the image sensor 216 and the audio frames received from the sound sensor 218. Additionally or alternatively, the image frames and the audio frames as well as one or more associated timestamps may be stored in the storage unit 240. The storage unit 240 may also store the camera parameters and location information, which may include camera parameters such as a focal length, a direction, ISO, shutter speed, aperture, etc. of the camera 122 and the location information from the location sensor 230. The storage unit 240 may be a local storage, and may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive).

Upon receiving the images and the corresponding audio frames from the camera 122, the video processing unit 214 may transmit the images and the corresponding audio frames to the electronic device 110 as the video stream via the communication unit 220. Alternatively, the video processing unit 214 may combine the images and corresponding audio frames into a plurality of video frames, which may be transmitted to the electronic device 110 as the video stream via the communication unit 220. In another embodiment, the captured images may be transmitted to the electronic device 110 as the video stream without the audio frames. In addition to transmitting the video stream, the video processing unit 214 may transmit camera parameters and location information associated with the video stream to the electronic device 110 via the communication unit 220 for use in determining an audio beamforming angle for the target scene 100.

Figure 3:
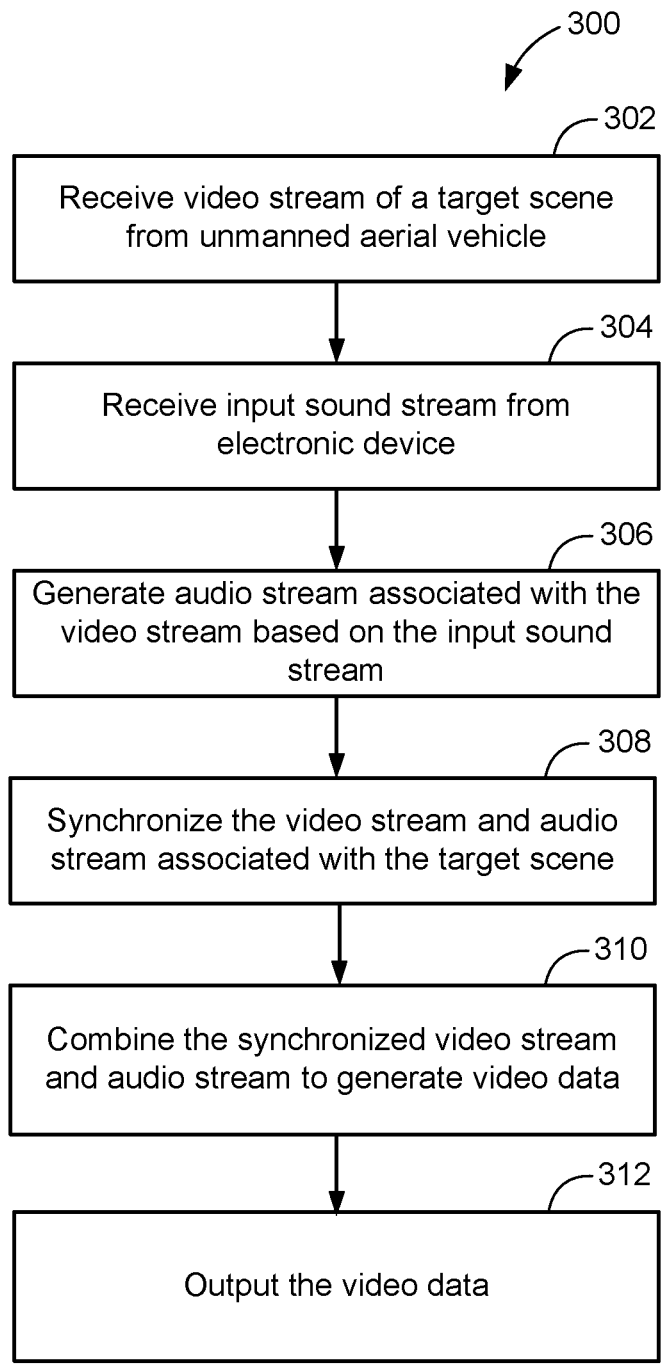
FIG. 3 illustrates a flow chart of a method performed by the electronic device for generating video data of the target scene, according to one embodiment of the present disclosure.

FIG. 3 illustrates a flow chart of a method 300 performed by the electronic device 110 for generating video data of the target scene 100, according to one embodiment of the present disclosure. At 302, the electronic device 110 may receive a video stream of the target scene 100 captured by the camera 122 of the UAV 120. The received video stream may include a plurality of image frames and audio frames as well as one or more timestamps associated with the image and/or audio frames. Additionally, the electronic device 110 may receive camera parameters and location information of the UAV 120.

As the video stream is received from the UAV 120, the electronic device 110 may receive an input sound stream, at 304, which may include sounds from the target scene 100 and outside the target scene 100 via the sound sensor 112. At 306, the electronic device 110 generates an audio stream associated with the video stream based on the input sound stream. For example, the electronic device 110 may selectively extract the audio stream from the input sound stream that is received from an angle or a direction corresponding to the target scene 100 based on the camera parameters and location information of the UAV 120. At 308, the electronic device 110 may synchronize the received video stream and audio stream associated with the target scene 100 based on the timestamps associated with the image and/or audio frames of the video stream. Upon synchronization, the electronic device 110 may combine or synthesize the video stream of the target scene 100 (e.g., the image frames and audio frames) with the audio stream associated with the target scene 100 to generate video data of the target scene 100 at 310. In this manner, the generated video data may enhance the sound quality of the video stream captured by the camera 122 in the UAV 120. At 312, the electronic device 110 may output the video data via the display screen 114 and/or a speaker.

Figure 4:
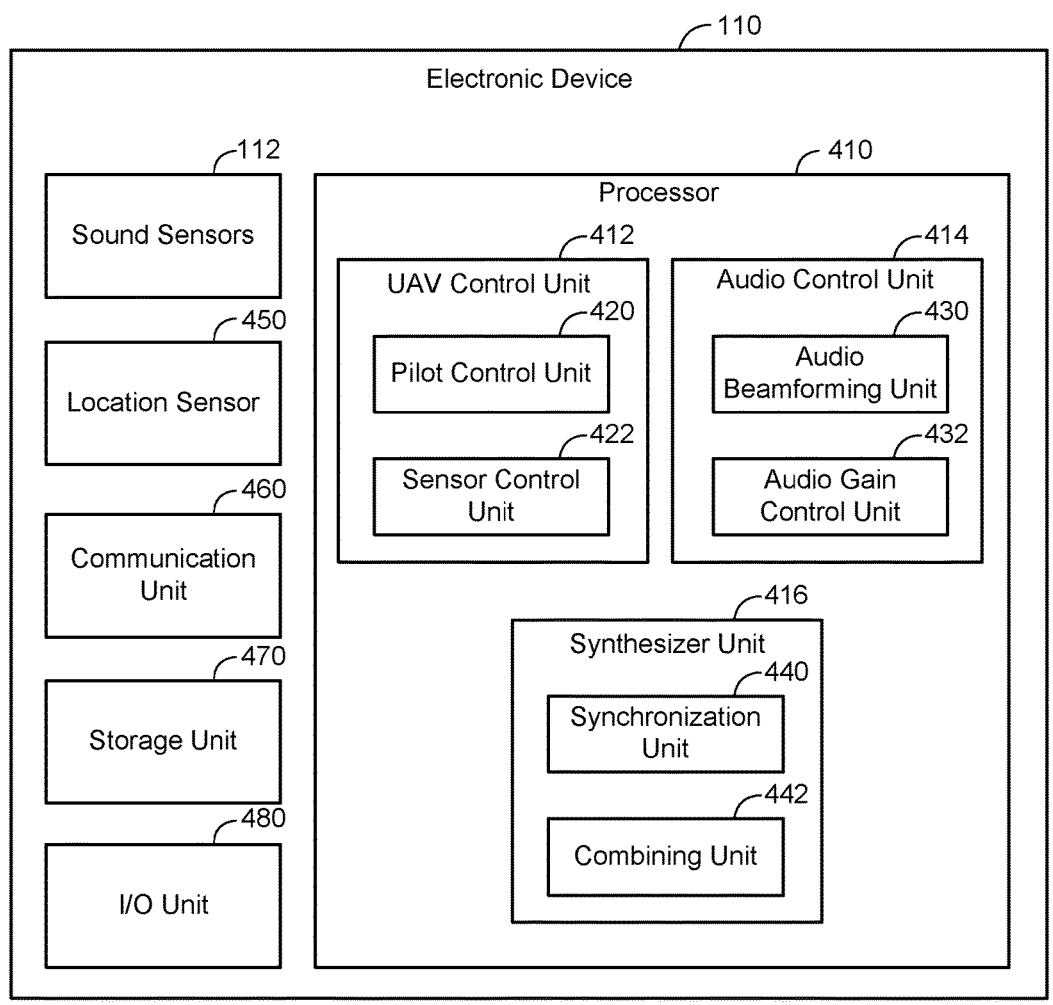
FIG. 4 illustrates a block diagram of the electronic device configured to combine the video stream received from the camera of the unmanned aerial vehicle and the audio stream associated with the target scene to generate video data of the target scene, according to one embodiment of the present disclosure.

FIG. 4 illustrates a block diagram of the electronic device 110 configured to combine the video stream received from the camera 122 of the UAV 120 and the audio stream associated with the target scene 100 to generate video data of the target scene 100, according to one embodiment of the present disclosure. The electronic device 110 may include the sound sensors 112, a processor 410, a location sensor 450, a communication unit 460, a storage unit 470, and an input/output (I/O) unit 480. The electronic device 110 may communicate wirelessly with the UAV 120 via the communication unit 460, which may employ any suitable wireless communication scheme such as Wi-Fi, WiMAX, Bluetooth, or any other wireless communication technologies (e.g., 4G, 5G, etc.) capable of wirelessly transmitting data. The processor 410 may be any suitable processor, processing unit, or circuitry capable of managing and/or operating the electronic device 110, such as an application processor (AP), central processing unit (CPU), digital signal processor (DSP), etc. As used herein, the term "unit" may refer to one or more hardware components, sections, parts, or circuitry capable of performing or adapted to perform one or more functions and may additionally perform such functions in conjunction with or by executing processes, instructions, procedures, subroutines, or the like (e.g., program code, microcode, etc.). In turn, a "unit" may be segmented into smaller units (e.g., sub-units) or two or more units may be combined into a single "unit."

The input and output (I/O) unit 480 in the electronic device 110 may be configured to receive an input from the user 130 such as flight instructions and camera parameters to control the flight operation and camera operation of the UAV 120) and/or output information or data such as flight information, camera parameter, video data of the target scene 100, and/or the like. The I/O unit 480 may be any suitable device capable of receiving an input from the user 130 and may include a touch screen, a button, a keypad, a touchpad, a joy stick, a control stick, or the like. Additionally, the I/O unit 480 may be any device capable of outputting information or data such as the combined video data of the target scene 100, and may include a display screen, a speaker, or the like.

The processor 410 may include a UAV control unit 412, which includes a pilot control unit 420 and a sensor control unit 422. The pilot control unit 420 may be configured to wirelessly control the flight or movement of the UAV 120 by transmitting flight instructions to the UAV 120 via the communication unit 460. For example, the flight instructions may include any suitable parameters or instructions to control or pilot the UAV 120 such as a flight path, a destination, speed, acceleration, directions, coordinates, an altitude, a tilt/orientation of the UAV, and/or the like, which may be input by the user 130 via the I/O unit 480 in the electronic device 110.

The sensor control unit 422 in the UAV control unit 412 may be configured to control and adjust the camera parameters of the camera 122 in the UAV 120 via the communication unit 460. For example, in response to one or more camera parameters input by the user 130 via the I/O unit 480, the sensor control unit 422 may control the focal length of the camera 122 to zoom in or out of the target scene 100 and/or a direction of the camera 122 to capture a desired target scene. Additionally or alternatively, the sensor control unit 422 may control the aperture, the ISO, or other camera parameters to capture images of the target scene 100 with a desired image quality.

In the electronic device 110, the processor 410 may include an audio control unit 414, which includes an audio beamforming unit 430 and an audio gain control unit 432. The audio beamforming unit 430 may be configured to determine an audio beamforming angle indicative of or corresponding to the target scene 100 with respect to a reference direction defined by the sound sensors 112 (i.e., a plurality of microphones) in the electronic device 110. In one embodiment, the audio beamforming unit 430 may receive camera parameters associated with the video stream being received from the UAV and location information of the UAV 120 via the communication unit 460. Further, the location sensor 450 may be configured to detect location information of the electronic device 110 such as a direction of movement, speed of movement, an acceleration, a tilt/orientation, and/or a coordinate (e.g., latitude, longitude, and altitude) of the electronic device 110, and provide the location information to the audio beamforming unit 430. For example, the location sensor 450 may employ any number or combination of sensors such as a direction sensor, a gyro sensor (e.g., a gyroscope), an acceleration sensor (e.g., an accelerometer), an altimeter, a GPS (global positioning system) receiver, and the like. Based on the location information (e.g., a coordinate, a tilt/orientation, etc.) received from the location sensor 450, the audio beamforming unit 430 may update the orientation of the reference direction of the sound sensors 112. Upon receiving the camera parameters, the location information of the UAV 120, and the location information from the location sensor 450, the audio beamforming unit 430 may determine the audio beamforming angle indicative of or corresponding to the target scene 100 of the video stream captured by the camera 122 of the UAV 120, as will be described in more detail below with reference to FIGS. 5 and 6.

Upon determining the audio beamforming angle indicative of or corresponding to a sound source of the target scene 100, the audio beamforming unit 430 may determine an audio stream associated with the target scene 100 based on the input sound stream received by the one or more sound sensors 112. In one embodiment, the audio beamforming unit 430 may selectively extract the audio stream from the input sound stream based on a direction of the camera 122 in the unmanned aerial vehicle 120. Additionally or alternatively, the audio stream may be selectively extracted based on at least one of an orientation (e.g., a tilt) or a spatial arrangement (e.g., an alignment, a position, etc.) of the sound sensors 112 in the electronic device 110. The audio stream associated with the target scene 100 may then be transmitted to the audio gain control unit 432.

The audio gain control unit 432 may be configured to receive the audio stream and audio segments or frames of the video stream received from the UAV 120. Upon receiving the audio stream, the audio gain control unit 432 may adjust a gain of the audio stream and/or noise of the UAV 120 in the video stream based on a distance between the UAV 120 and a location in the target scene 100. As used herein, the term "noise" may refer to sounds that are unrelated to a target scene and may be generated by the UAV 120 such as engine noise, propeller sound, wind noise, and/or the like. For example, the input sound stream received via the sound sensor 218 of the UAV 120 may include sound from the target scene 100 and sound from outside the target scene, as well as various noise associated with the UAV 120.

In one embodiment, as the distance between the target scene 100 and the UAV 120 decreases, the gain of the audio stream indicative of or corresponding to the target scene 100 may be increased while a suppression level of the noise in the video stream (i.e., the input sound stream received from the sound sensor 218 of the UAV 120) may be decreased. On the other hand, as the distance between the target scene 100 and the UAV 120 increases, the gain of the audio stream indicative of or corresponding to the target scene 100 may be decreased while a suppression level of the noise in the video stream (i.e., the input sound stream received from the sound sensor 218 of the UAV 120) may be increased. After adjusting the gain of the audio stream indicative of or corresponding to the target scene 100 and the suppression level of the noise in the video stream, the audio gain control unit 432 may provide the audio stream adjusted in gain and the input sound stream of the video stream that has been adjusted in suppression level to a synthesizer unit 416 in the processor 410.

The synthesizer unit 416 may include a synchronization unit 440 and a combining unit 442. The synchronization unit 440 may be configured to receive the audio stream, which is associated with the target scene 100 and may have been adjusted in gain, and the input sound stream of the video stream, which may have been adjusted in suppression level, from the audio gain control unit 432. The synchronization unit 440 may then synchronize the video frames of the video stream, which may include the input sound stream that has been adjusted in noise suppression level, with the audio stream associated with the target scene 100. The synchronized video frames, which may include the input sound stream adjusted in noise suppression level, and the audio stream may be provided to the combining unit 442, which may combine the video frames (e.g., image frames and input sound stream adjusted in noise suppression level) and the audio stream to generate video data of the target scene 100. The generated video data may then be provided to the I/O unit 480, which may display the image portions of the video data on the display screen 114 and play the audio portions of the video data via a speaker.

In some embodiments, an external server may be configured to perform the functions of the synchronization unit 440 and/or the combining unit 442 in the synthesizer unit 416. In one embodiment, the electronic device 110 may provide the video stream, which may include the input sound stream adjusted in noise suppression level, and the audio stream to the server, which may synchronize and combine the the video stream and the audio stream to generate the video data. Alternatively, the electronic device 110 may provide the synchronized video stream and the audio stream to the server, which may combine the synchronized video stream and the audio stream to generate the video data. The server may then transmit the video data to the electronic device 110, which may display the image portions of the video data on the display screen 114 and play the audio portions of the video data via a speaker.

In one embodiment, the synchronization unit 440 may synchronize the video stream and the audio stream associated with the target scene 100 based on timestamps associated with the video frames of the video stream and the audio frames of the audio stream. For example, a plurality of timestamps associated with the image frames and audio frames of the video stream may be received from the audio control unit 414. Further, the audio control unit 414 may tag or link the audio stream associated with the target scene 100 with a plurality of timestamps. In this case, the electronic device 110 and the UAV 120 may be synchronized in time before or at the time the video stream and the audio stream are captured. Based on the timestamps, the synchronization unit 440 may synchronize the video stream and the audio stream associated with the target scene 100.

In another embodiment, the synchronization unit 440 may synchronize the video stream and the audio stream associated with the target scene 100 based on a start signal and a stop signal. For example, the electronic device 110 may transmit the start signal to the UAV 120, which may control the camera 122 to start capturing the video stream in response. Simultaneously, the electronic device 110 may start receiving or capturing the input sound stream via the sound sensors 112. Subsequently, the electronic device 110 may transmit the stop signal to the UAV 120, which may control the camera 122 to stop capturing the video stream in response. At the same time, the electronic device 110 may stop receiving or capturing the input sound stream via the sound sensors 112. As the input sound stream is being received from the sound sensors 112, the electronic device 110 may generate the audio stream associated with the video stream based on the input sound stream. As the video stream and the input sound stream are received in response to the start signal, the electronic device 110 may synchronize the video stream and the audio stream based on the start time associated with the start signal and a frame rate of the video stream and the input sound stream. Additionally or alternatively, based on the initial and final frames of the video stream and the input sound stream captured in response to the start and stop signals, the synchronization unit 440 may synchronize intermediate frames for the video stream and the audio stream associated with the video stream, which are frames between the initial and final frames, using any suitable interpolation methods.

Figure 5:
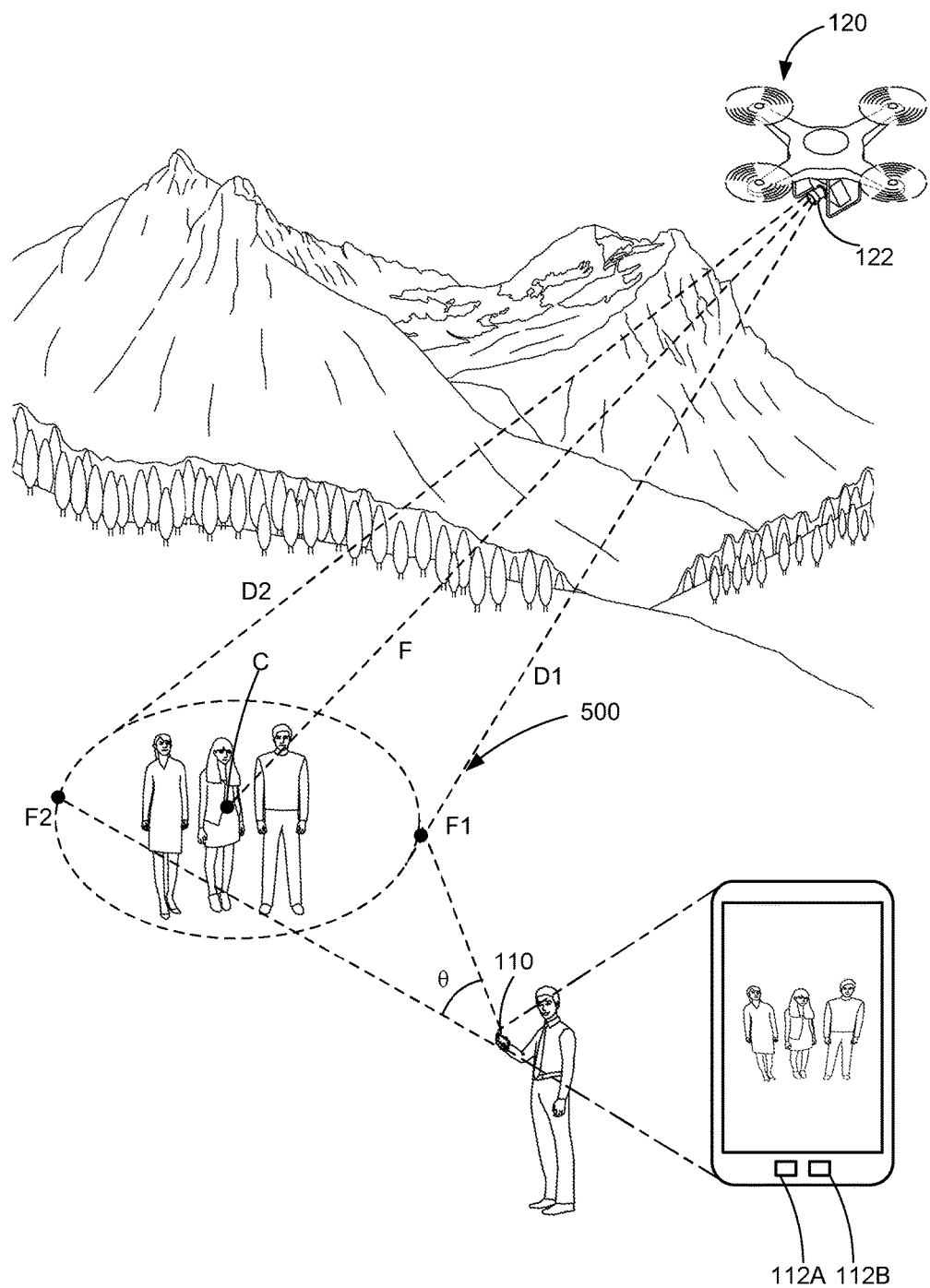
FIG. 5 is an exemplary diagram for determining an audio beamforming angle indicative of or corresponding to a target scene by the audio beamforming unit of the electronic device, according to one embodiment of the present disclosure.

FIG. 5 is an exemplary diagram for determining an audio beamforming angle θ indicative of or corresponding to a target scene 500 by the audio beamforming unit 430 of the electronic device 110, according to one embodiment of the present disclosure. Although the audio beamforming unit 430 is illustrated as determining the audio beamforming angle θ for the target scene 500, it may determine any suitable audio beamforming angles for any other target scenes (e.g., the target scene 100). In one embodiment, the audio beamforming unit 430 may determine a plurality of geometric parameters associated with the target scene 500 with respect to the electronic device 110 and the UAV 120 based on camera parameters, location information of the UAV 120, and location information of the electronic device 110. The location information of the UAV 120 may include a coordinate and a tilt/orientation of the UAV 120 as well as a direction of the camera 122. Similarly, the location information of the electronic device 110 may include a coordinate and a tilt/orientation of the electronic device 110 as well as an orientation of the one or more sound sensors 112 and a spatial arrangement of the sound sensors 112.

In the illustrated embodiment, the UAV 120 may be capturing a video stream of the target scene 500 with a focal distance F from a center focus point C of the target scene 500 to the camera 122, which may be determined based on a focal length of the camera 122. For each of the images in the video stream, the audio beamforming unit 430 may calculate a distance between the target scene 500 and the UAV 120 based on the focal distance F of the camera parameter received from the UAV 120. For example, based on the focal distance F of the camera 122 and a direction and tilt/orientation of the camera 122, which may be received from a gyroscope or a compass mounted in the camera 122 (or the UAV 120), the focal distance F between the camera 122 of the UAV 120 and the center focus point C of the target scene may be obtained. While the audio beamforming unit 430 uses the focal distance corresponding to a center focus point, it may also use a distance between the camera 122 and any suitable focus point in the target scene 500.

Additionally, the audio beamforming unit 430 may determine a coordinate of the UAV 120 with respect to the one or more sound sensors 112 (e.g., 112A and 112B), which may be assumed to correspond to the location of the electronic device 110. In one embodiment, a reference coordinate of the sound sensors 112 may be obtained from the location information received from the location sensor 450 of the electronic device 110 and the coordinate of the UAV 120 with respect to the sound sensors 112 may also be obtained based on the camera parameters and location information received from the UAV 120. Further, a distance between the UAV 120 and the sound sensors 112 may be determined based on the coordinates of the UAV 120 and the reference coordinate of the sound sensors 112.

In some embodiments, the target scene 500 being captured by the camera 122 may be within a field of view (e.g., an angle of view) of the lens of the camera 122. The field of view may be a width or a diagonal measurement or between two points in an image. In the illustrated embodiment, the target scene 500 may be indicated as a circle or an oval with a pair of diagonally opposing points F1 and F2. Although the target scene 500 is illustrated as an oval, it may be any suitable shape such as a rectangle, circle, or the like and may also correspond to a two- or three-dimensional scene.

In the illustrated embodiment, a distance between the point F1 and the camera 122 may be indicated as a distance D1 while a distance between the point F2 and the camera 122 may be indicated as a distance D2. The audio beamforming unit 430 may estimate distances D1 and D2 based on the camera parameters received from the UAV 120. For example, based on camera parameters such as the focal length or focal distance F, the field of view (or angle of view), and/or other suitable camera parameters, the audio beamforming unit 430 may determine the distances D1 and D2.

Upon determining the coordinates of the UAV 120 and the electronic device 110 (or the sound sensors 112) and the distances D1 and D2, the audio beamforming unit 430 may determine the coordinates (a1, b1, c1) and (a2, b2, c2) of the points F1 and F2, respectively. Based on the coordinates F1 and F2 and at least one of the tilt/orientation or the spatial arrangement of the sound sensors in the electronic device 110, the audio beamforming angle θ of the target scene 500 with respect to a reference location of the sound sensors 112 may be calculated.

In an additional or alternative embodiment, the UAV 120 or the camera 122 may include a gyroscope or a compass that is capable of obtaining a direction of the camera 122. Upon obtaining the direction of the camera 122 that may correspond to an approximate direction of the target scene 500, the UAV 120 may transmit the direction of the target scene 500 to the audio beamforming unit 430 of the electronic device 110. Based on the direction of the target scene 500 received from the UAV 120, the audio beamforming unit 430 may selectively extract the audio stream of the target scene 500 from an input sound stream that is received in or along the direction of the target scene 500. While the accuracy of this method may be reduced, the audio beamforming unit 430 may use the approximated direction of the target scene to quickly determine the direction of the target scene 500 and selectively extract the audio stream of the target scene 500.

Although the illustrated embodiment is shown with two sound sensors 112A and 112B, any other suitable number of sound sensors may be provided in the electronic device 110. In the case of one sound sensor, the audio gain control unit 432 may control the gain of the audio stream based on a distance between the UAV 120 and a location in the target scene 500. For example, the gain of the audio stream may be adjusted based on the focal distance F. Alternatively or additionally, the gain of the audio stream may be exponentially decayed as D increases, where D may be a distance between the UAV 120 and the center focus point (e.g., C) of the target scene 500. In another embodiment, instead of applying a gain to the audio stream, an acoustic impulse response that reflects a distance between the UAV 120 and the target scene 500 may be applied. In this case, an audio stream that reflects the distance (i.e., an audio stream with adjusted gain based on the distance) may be generated by filtering the audio stream with the impulse response.

Figure 6:
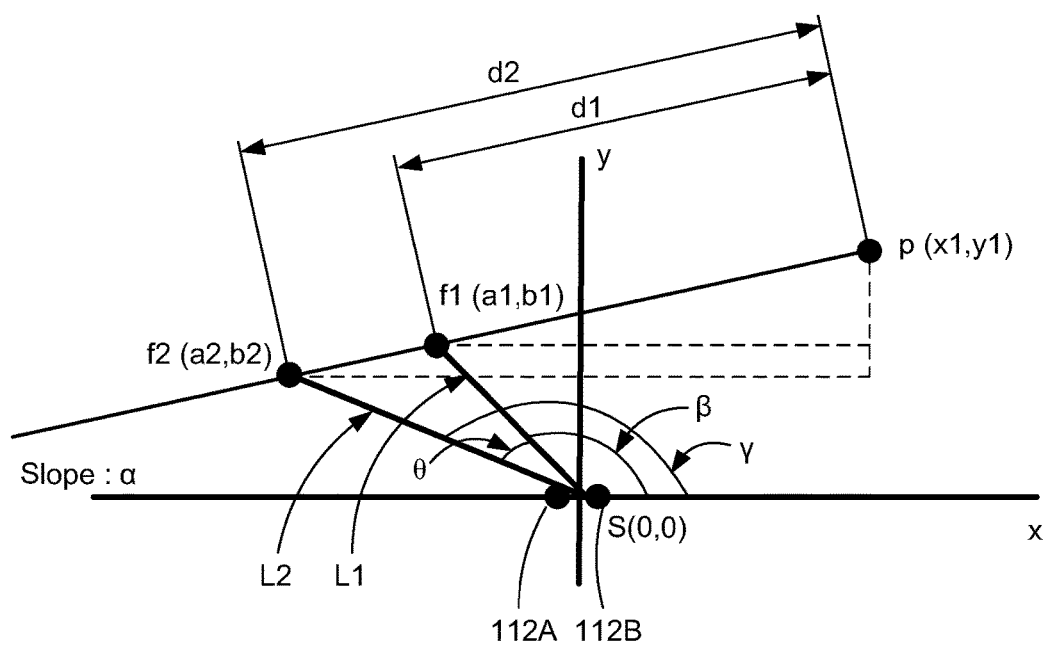
FIG. 6 illustrates a simplified diagram for determining an audio beamforming angle indicative of or corresponding to the target scene, according to one embodiment of the present disclosure.

FIG. 6 illustrates a simplified diagram for determining an audio beamforming angle θ indicative of or corresponding to the target scene 500, according to one embodiment of the present disclosure. For ease of explanation, the diagram illustrates a pair of sound sensors 112A and 112B, which are located along a reference direction (e.g., x-axis) defined by the sound sensors 112A and 112B. The reference location of the sound sensors 112A and 112B may be indicated as a coordinate S(0, 0).

In one embodiment, a coordinate p(x0, y0, z0) of the UAV 120 (i.e., a coordinate of the camera 122) and a coordinate S(a, b, c) of the reference location of the sound sensors 112A and 112B may be assigned in a three-dimensional coordinate system. Based on a tilt/orientation and/or a spatial arrangement of the sound sensors 112A and 112B, the coordinate p(x0, y0, z0) of the camera 122 may be projected onto a same plane as the coordinate S(a, b, c) of the reference location of the sound sensors 112A and 112B by rotating the coordinates p(x0, y0, z0) and S(a, b, c). In this case, the coordinates of the points F1 and F2 in the target scene 500 may also be rotated to project onto the same plane. Thereafter, the coordinate S(a, b, c) of the reference location of the sound sensors 112A and 112B may be moved to S(0, 0, 0) and the coordinate p(x0, y0, z0) of the UAV 120 may also be moved in a same direction and coordinate distance as the movement from the coordinate S(a, b, c) to the new coordinate S(0, 0, 0) by aligning the coordinates. Additionally, the coordinates of the points F1 and F2 in the target scene 500 may also be moved in the same direction and coordinate distance as the movement of the coordinate S(a, b, c) to the new coordinate S(0, 0, 0).

After the rotating and aligning the three dimensional coordinates, the three-dimensional coordinates may be projected onto the two dimensional x-y plane and two-dimensional coordinates p(x1, y1), f1(a1, b1), f2(a2, b2) and S(0, 0) may be assigned, as shown in FIG. 6. For example, the x-axis of the x-y plane may be aligned to the reference direction of the sound sensors 112A and 112B. That is, the reference direction defined by the two sound sensors 112A and 112B may be configured to be along the x-axis. Further, the distance D1 between the coordinate p(x0, y0, z0) of the camera 122 of the UAV 120 and the coordinate (a1, b1, c1) of the point F1 may be projected as a distance d1 between the coordinate p(x1, y1) and a coordinate f1(a1, b1). On the other hand, the distance D2 between the coordinate p(x0, y0, z0) of the camera 122 of the UAV 120 and the coordinate (a2, b2, c2) of the point F2 may be projected as a distance d2 between the coordinate p(x1, y1) and a coordinate f2(a2, b2).

In one embodiment, the coordinates f1(a1, b1) and f2(a2, b2) may be projected along a line indicative of a view direction of the camera 122 from the coordinate p(x1, y1) of the UAV 120. In this case, a slope α of the projected line indicative of an angle or tilt of the camera direction may be determined based on a tilt and/or orientation of the electronic device 110, which may be received from a compass and/or a gyroscope of the electronic device 110. Additionally or alternatively, the slope α may be determined based on the coordinates of p(x1, y1), f1(a1, b1), and f2(a2, b2). Based on the coordinates and the slope, the coordinate values of f1(a1, b1), and f2(a2, b2) may be determined according to the following equations:

$$f1(a1,b1)=(x1-d1*\cos(\alpha), y1-d1*\sin(\alpha)) \qquad \text{Equation (1)}$$

$$f2(a2,b2)=(x1-d2*\cos(\alpha), y1-d2*\sin(\alpha)) \qquad \text{Equation (2)}$$

Based on the coordinates of the projected points f1, an angle β indicating an angle between a direction L1 from the reference location S(0, 0) of the sound sensors 112A and 112B to the projected point f1(a1, b1) may be determined by calculating a value of arctan(b1/a1). Similarly, an angle γ indicating an angle between a direction L2 from the reference location S(0, 0) of the sound sensors 112A and 112B to the projected point f2(a2, b2) may be determined by calculating a value of arctan(b2/a2). Upon determining the angles β and γ, the audio beamforming unit 430 may determine the audio beamforming angle θ by subtracting β from γ. Although the audio beamforming unit 430 is described as determining an audio beamforming angle for the sound sensors 112A and 112B, it may also determine an audio beamforming angle for any suitable number of sound sensors 112. In such a case, the above calculations may be performed for each pair of sound sensors 112 to enhance accuracy in determining the audio beamforming angle.

Figure 7:
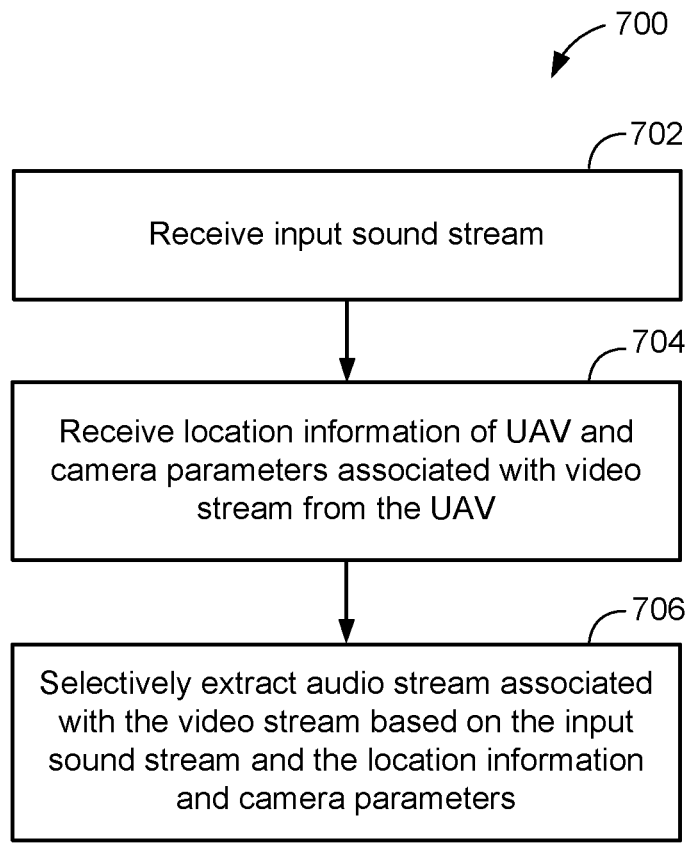
FIG. 7 illustrates a flow chart of a method performed by the electronic device for generating an audio stream of a target scene, according to one embodiment of the present disclosure.

FIG. 7 illustrates a flow chart of a method 700 performed by the electronic device 110 for generating an audio stream of a target scene, according to one embodiment of the present disclosure. At 702, the sound sensors 112 of the electronic device 110 may receive an input sound stream. At 704, the electronic device 110 may receive location information of the UAV 120 and camera parameters of the target scene associated with a video stream captured by the camera 122 of the UAV 120. As the camera parameters and location information are received from the UAV 120, the electronic device 110 may also receive location information from the location sensor 450 of the electronic device 110. Based on the location information and camera parameters, the audio beamforming unit 430 may selectively extract the audio stream associated with the video stream from the input sound stream at 706. In one embodiment, the audio beamforming unit 430 may determine an audio beamforming angle associated with the target scene based on the location information from the UAV 120, camera parameters from the UAV 120, and the location sensor 450 of the electronic device 110. The audio stream may then be selectively extracted from the input sound stream based on the audio beamforming angle.

Figure 8:
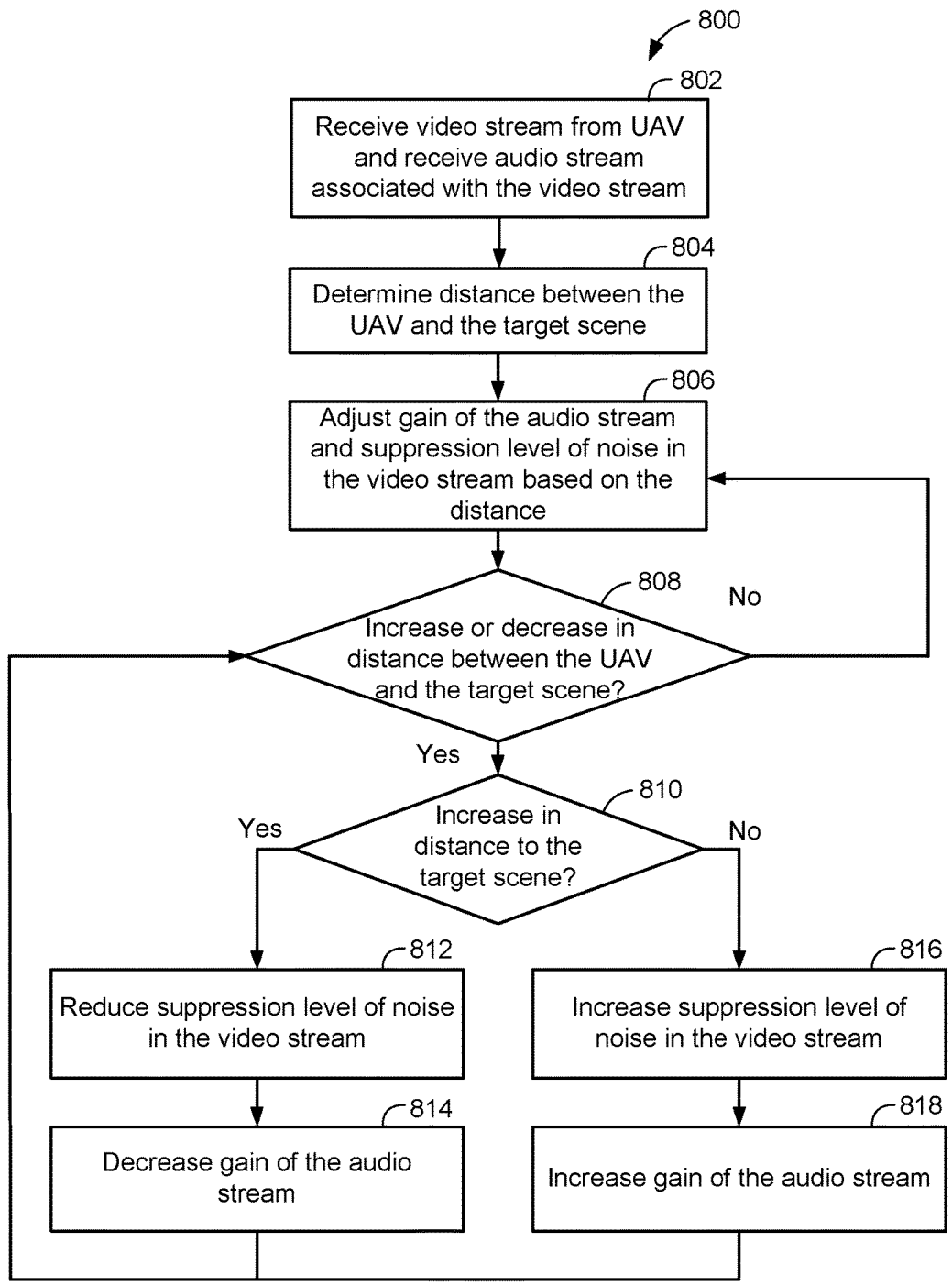
FIG. 8 illustrates a flow chart of a method performed by the audio gain control unit of the electronic device for adjusting a gain of an audio stream associated with a video stream and a suppression level of noise associated with the unmanned aerial vehicle in the video stream, according to one embodiment of the present disclosure.

FIG. 8 illustrates a flow chart of a method 800 performed by the audio gain control unit 432 of the electronic device 110 for adjusting a gain of an audio stream associated with a video stream and a suppression level of noise associated with the UAV 120 in the video stream, according to one embodiment of the present disclosure. At 802, the audio gain control unit 432 may receive the video stream captured by the camera 122 of the UAV 120 and the audio stream associated with the video stream from the sound sensors 112 of the electronic device 110. In one embodiment, the audio stream and audio portions of the video stream, which may include noise associated with the UAV 120, may be received continuously as first audio frames and second audio frames, respectively. For a first audio frame and a corresponding second audio frame that are captured at a particular time, the audio gain control unit 432 may determine, at 804, a distance between the UAV 120 and the target scene based on the location information and camera parameters received from the UAV 120 and location information received from the electronic device 110. At 806, based on the distance between the UAV 120 and the target scene, the audio gain control unit 432 may adjust a gain of the first audio frame associated with the target scene and determine a suppression level of the second audio frame received from the UAV 120. For example, the gain of the first audio frame and the suppression level of the second audio frame may be adjusted to predetermined values according to the distance.

As the next pair of first audio and second audio frames is received, the audio gain control unit 432 may determine whether the distance between the UAV 120 and the target scene has increased or decreased for the first audio and second audio frames at 808. If it is determined that the distance has not changed (i.e., no increase or decrease in the distance), the audio gain control unit 432 may proceed to adjust the gain of the first audio frame and the suppression level of noise in the second audio frame, at 806, in the same manner as the previous first audio and second audio frames. On the other hand, if the distance has either increased or decreased, it may be determined whether the distance has increased at 810. If the distance is determined to have increased at 810, the audio gain control unit 432 may proceed to reduce suppression level in noise of the second audio frame received from the UAV at 812 and decrease gain of the first audio frame associated with the target scene at 814. If the distance is determined to have decreased at 810, the audio gain control unit 432 may proceed to increase suppression level in noise of the second audio frame received from the UAV at 816 and increase gain of the first audio frame associated with the target scene at 818. In one embodiment, the gain of the audio stream may be exponentially decayed as D increases, where D may be a distance between the UAV 120 and a center focus point of the target scene. Upon adjusting the gain of the first audio frame and the suppression level of noise in the second audio frame, the audio gain control unit 432 may proceed to determine whether the distance between the UAV 120 and the target scene has increased or decreased for a next pair of first audio and second audio frames at 808. In this manner, gain of the first audio frames associated with the target scene and suppression level of noise in the second audio frames from the UAV 120 may be adjusted continuously according to changes in distance between the UAV 120 and the target scene.

Figure 9:
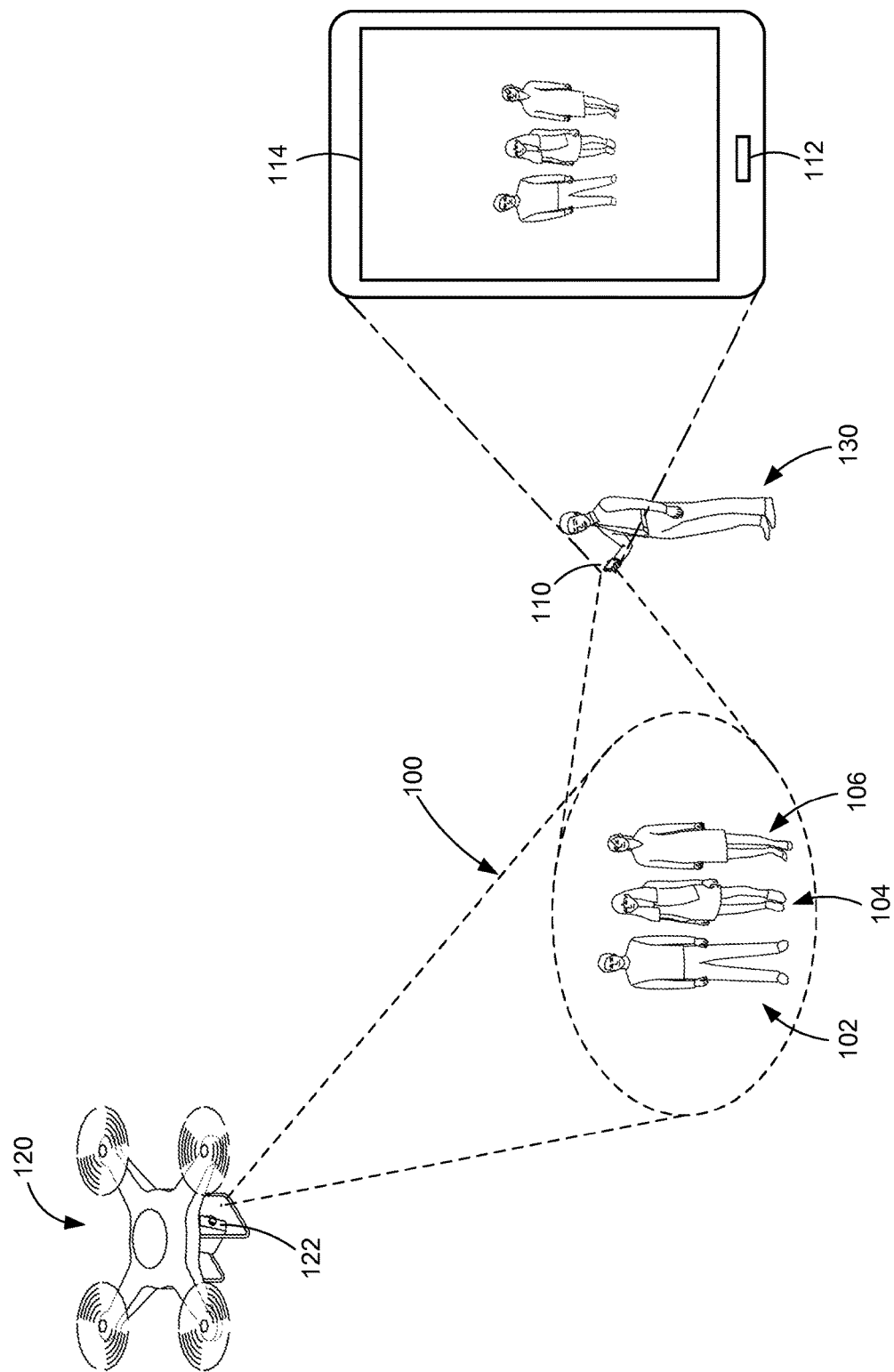
FIG. 9 illustrates an exemplary diagram for adjusting a gain of an audio stream associated with a target scene and a suppression level of noise of the unmanned aerial vehicle in a video stream, according to one embodiment of the present disclosure.

FIG. 9 illustrates an exemplary diagram for adjusting a gain of an audio stream associated with a target scene and a suppression level of noise of the UAV 120 in a video stream, according to one embodiment of the present disclosure. As shown, the electronic device 110 may be located within an audible range of the target scene 100 and may extract the audio stream from an input sound stream received via the sound sensors 112 from the target scene 100. On the other hand, the UAV 120 may capture the video stream of the target scene 100 from a location distant from the target scene 100 such that the UAV 120 is outside an audible range of the target scene 100. The video stream may include a plurality of image frames and audio frames, which may be transmitted sequentially to the electronic device 110.

In the electronic device 110, the audio beamforming unit 430 may selectively extract the audio stream corresponding to or indicative of the target scene 100 from the input sound stream received via the sound sensors 112. As the audio stream associated with the target scene 100 is received from the audio beamforming unit 430, the audio gain control unit 432 may decrease the gain of the audio stream associated with the target scene 100. On the other hand, as the video stream from the UAV 120 is received, the audio gain control unit 432 may reduce the suppression level of noise in the UAV 120 of the video stream. Once the gain of the audio stream and the suppression level of noise have been adjusted, the audio stream adjusted in gain and the video stream adjusted in noise suppression level may be synchronized and combined to generate video data. The image portions of the video data may then be displayed on the display screen 114 of the electronic device 110 and the audio portions of the video data may be output via the I/O unit 480 (e.g., a speaker) in the electronic device 110.

In the illustrated embodiment, the objects in the displayed image of the target scene 100 such as the persons 102, 104, 106 may appear to be small due to the distance of the UAV 120 from the target scene 100. In this case, the gain of the audio stream associated with the target scene 100 may be decreased and the suppression level of noise of the UAV 120 in the video stream may be decreased to reflect the distance from the target scene 100 or the size of the objects in the displayed image. Accordingly, reducing the gain of the audio stream and decreasing the suppression level of noise of the UAV 120 in the video stream may provide a more accurate or realistic sound experience for the user 130 of the electronic device 110.

In another embodiment, the gain of the audio stream may be further adjusted based on the zoom mode of the camera 122 of the UAV 120. For example, the camera 122 may zoom out while capturing the target scene 100, such that the electronic device 110 displays the target scene 100 in a reduced size on the display screen 114. This case may be virtually identical to the case where the distance from the target scene 100 and the UAV 120 is increased. Accordingly, the audio gain control unit 432 may decrease the gain of the audio stream received from audio beamforming unit 430 and decrease the suppression level of noise of the UAV 120 in the video stream received from the sound sensor 218 in the UAV 120.

Figure 10:
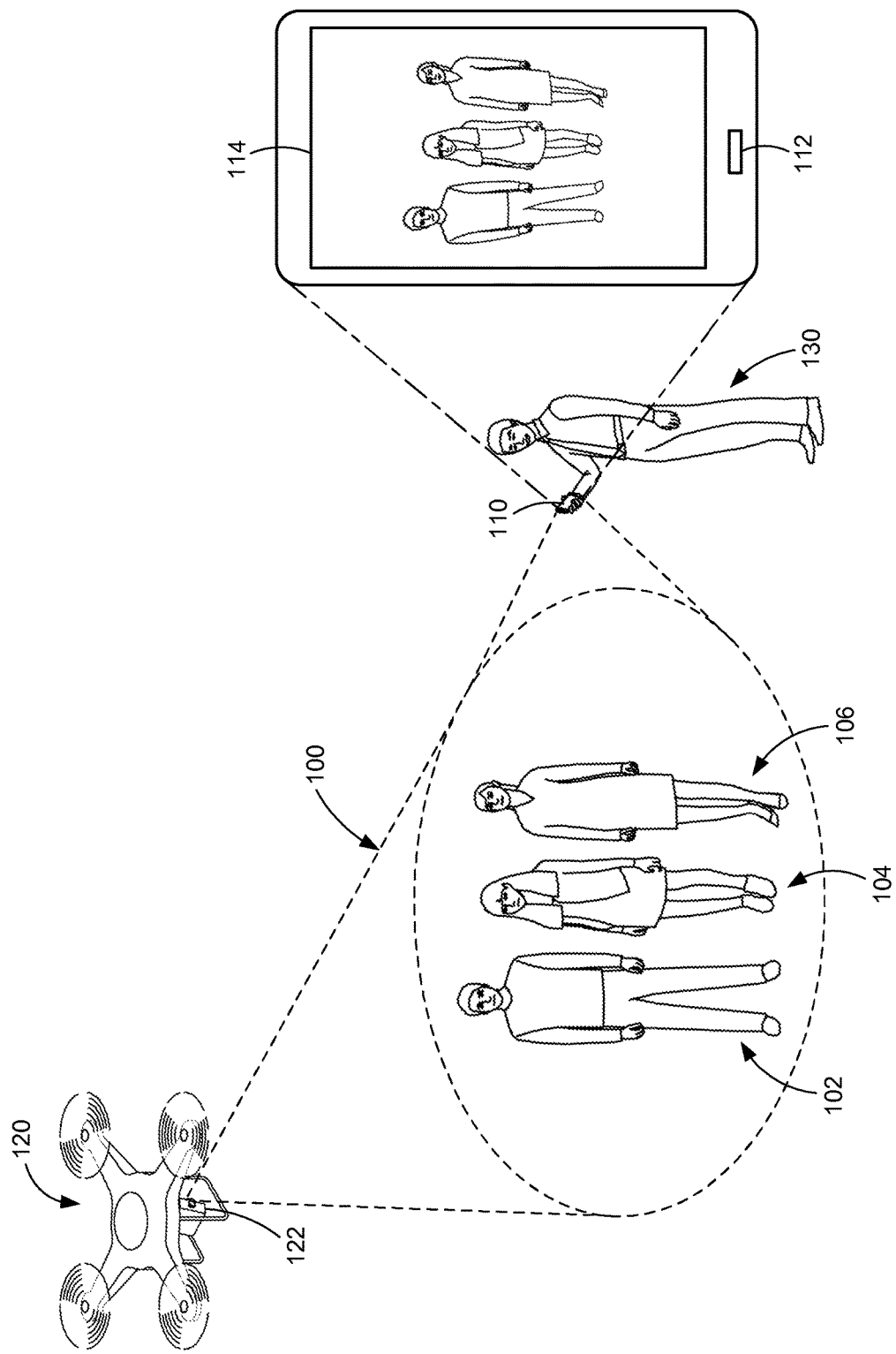
FIG. 10 illustrates an exemplary diagram for adjusting a gain of an audio stream associated with a target scene and a suppression level of noise of the unmanned aerial vehicle in a video stream when the unmanned aerial vehicle moves toward the target scene, according to one embodiment of the present disclosure.

FIG. 10 illustrates an exemplary diagram for adjusting a gain of an audio stream associated with a target scene and a suppression level of noise of the UAV 120 in a video stream when the UAV 120 moves toward the target scene 100, according to one embodiment of the present disclosure. As shown, the electronic device 110 may be located within an audible range of the target scene 100 and may extract the audio stream from an input sound stream received via the sound sensors 112 from the target scene 100. On the other hand, the UAV 120 may capture the video stream of the target scene 100 from a location near the target scene 100 such that the UAV 120 is within an audible range of the target scene 100. The video stream may include a plurality of image frames and audio frames, which may be transmitted sequentially to the electronic device 110.

In the electronic device 110, the audio beamforming unit 430 may selectively extract the audio stream corresponding to or indicative of the target scene 100 from the input sound stream received via the sound sensors 112. As the audio stream associated with the target scene 100 is received from the audio beamforming unit 430, the audio gain control unit 432 may increase the gain of the audio stream associated with the target scene 100. On the other hand, as the video stream from the UAV 120 is received, the audio gain control unit 432 may increase the suppression level of noise in the UAV 120 of the video stream. Once the gain of the audio stream and the suppression level of noise have been adjusted, the audio stream adjusted in gain and the video stream adjusted in noise suppression level may be synchronized and combined to generate video data. The image portions of the video data may then be displayed on the display screen 114 of the electronic device 110 and the audio portions of the video data may be output via the I/O unit 480 (e.g., a speaker) in the electronic device 110.

In the illustrated embodiment, the objects in the displayed image of the target scene 100 such as the persons 102, 104, and 106 may appear to be larger than the objects in the displayed image in FIG. 9 since the UAV 120 has moved closer to the target scene 100. In this case, the gain of the audio stream associated with the target scene 100 may be increased and the suppression level of noise of the UAV 120 in the video stream may be increased to reflect the shorter distance from the target scene 100 or the larger size of the objects in the displayed image. Accordingly, increasing the gain of the audio stream and increasing the suppression level of noise of the UAV 120 in the video stream may provide a more accurate or realistic sound experience for the user 130 of the electronic device 110.

In another embodiment, the gain of the audio stream may be further adjusted based on the zoom mode of the camera 122 of the UAV 120. For example, the camera 122 may zoom in while capturing the target scene 100, such that the electronic device 110 displays the target scene 100 in an enlarged size on the display screen 114. This case may be virtually identical to the case where the distance from the target scene 100 and the UAV 120 is decreased. Accordingly, the audio gain control unit 432 may increase the gain of the audio stream received from audio beamforming unit 430 and increase the suppression level of noise of the UAV 120 in the video stream received from the sound sensor 218 in the UAV 120.

Figure 11:
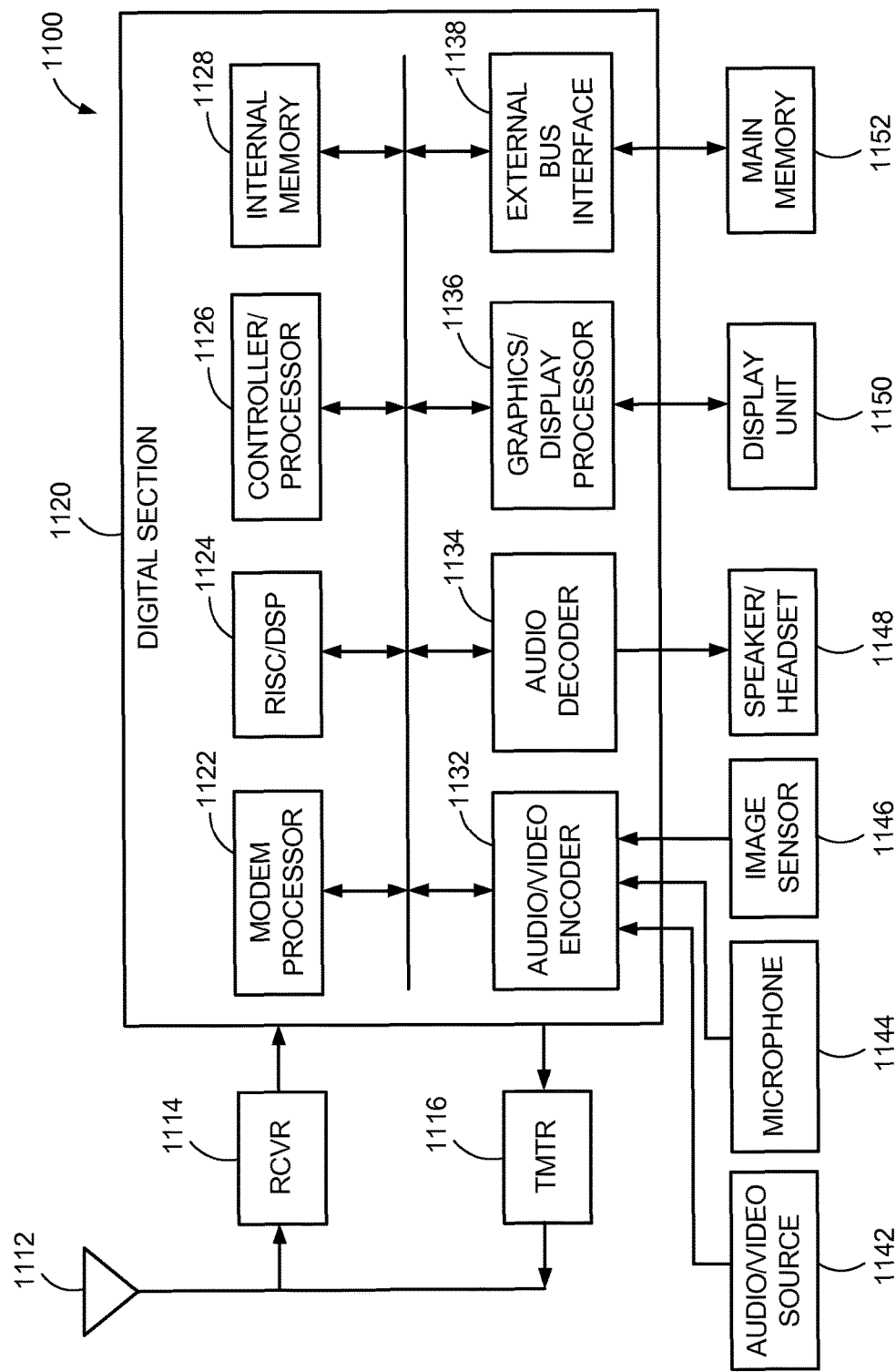
FIG. 11 illustrates a block diagram of an exemplary electronic device in which the methods and apparatus for generating video data based on a video stream received from an unmanned aerial vehicle and an audio stream received from an electronic device may be implemented, according to one embodiment of the present disclosure.

FIG. 11 illustrates a block diagram of an exemplary electronic device 1100 in which the methods and apparatus for generating video data based on a video stream received from an unmanned aerial vehicle and an audio stream received from an electronic device may be implemented, according to one embodiment of the present disclosure. The electronic device 1100 may be a cellular phone, a smartphone, a wearable computer, a smart watch, smart glasses, a tablet personal computer, a terminal, a handset, a personal digital assistant (PDA), a cordless phone, a tablet, and so on. The wireless communication system may be a CDMA system, a GSM system, a W-CDMA system, a LTE system, a LTE Advanced system, a Wi-Fi system and so on.

The electronic device 1100 may be capable of providing bidirectional communication via a receive path and a transmit path. On the receive path, signals transmitted by base stations may be received by an antenna 1112 and may be provided to a receiver (RCVR) 1114. The receiver 1114 may condition and digitize the received signal, and provide the conditioned and digitized digital signal to a digital section for further processing. On the transmit path, a transmitter (TMTR) 1116 may receive data to be transmitted from a digital section 1120, process and condition the data, and generate a modulated signal, which is transmitted via the antenna 1112 to the base stations. The receiver 1114 and the transmitter 1116 may be part of a transceiver that may support CDMA, GSM, W-CDMA, LTE, LTE Advanced, Wi-Fi and so on.

The digital section 1120 may include various processing, interface, and memory units such as, for example, a modem processor 1122, a reduced instruction set computer/digital signal processor (RISC/DSP) 1124, a controller/processor 1126, an internal memory 1128, a generalized audio/video encoder 1132, a generalized audio decoder 1134, a graphics/display processor 1136, and an external bus interface (EBI) 1138. The modem processor 1122 may perform processing for data transmission and reception, e.g., encoding, modulation, demodulation, and decoding. The RISC/DSP 1124 may perform general and specialized processing for the electronic device 1100. The controller/processor 1126 may perform the operation of various processing and interface units within the digital section 1120. The internal memory 1128 may store data and/or instructions for various units within the digital section 1120.

The generalized audio/video encoder 1132 may perform encoding for input signals from an audio/video source 1142, a microphone 1144, an image sensor 1146, etc. The generalized audio decoder 1134 may perform decoding for coded audio data and may provide output signals to a speaker/headset 1148. The graphics/display processor 1136 may perform processing for graphics, videos, images, and texts, which may be presented to a display unit 1150. The EBI 1138 may facilitate transfer of data between the digital section 1120 and a main memory 1152.

The digital section 1120 may be implemented with one or more processors, DSPs, microprocessors, RISCs, etc. The digital section 1120 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored at a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media. For example, a computer-readable storage medium may be a non-transitory computer-readable storage device that includes instructions that are executable by a processor. Thus, a computer-readable storage medium may not be a signal.

The previous description of the disclosure is provided to enable a person skilled in the art to make or use the disclosure. Various modifications to the disclosure will be readily apparent to those skilled in the art, and the generic principles defined herein are applied to other variations without departing from the scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment.

Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

ASPECTS OF THE PRESENT DISCLOSURE

Hereinafter, some aspects of the present disclosure will be additionally stated.

Example 1

According to an aspect of the present disclosure, there is provided an electronic device for generating video data, including: a communication unit configured to wirelessly receive a video stream captured by a camera, wherein the camera is located in an unmanned aerial vehicle; at least one sound sensor configured to receive an input sound stream; an audio control unit configured to generate an audio stream associated with the video stream based on the input sound stream; and a synthesizer unit configured to generate the video data based on the video stream and the audio stream.

Example 2

In the electronic device of Example 1, the electronic device is a controller configured to manually or automatically pilot the unmanned aerial vehicle.

Example 3

In the electronic device of any one of Examples 1 or 2, the synthesizer unit includes: a synchronization unit configured to synchronize the video stream and the audio stream; and a combining unit configured to generate the video data based on the synchronized video stream and audio stream.

Example 4

In the electronic device of any one of Examples 1 to 3, the audio control unit is configured to selectively extract the audio stream from the input sound stream based on a direction of the camera in the unmanned aerial vehicle.

Example 5

In the electronic device of any one of Examples 1 to 4, the audio control unit is configured to selectively extract the audio stream further based on at least one of an orientation or a spatial arrangement of the at least one sound sensor.

Example 6

In the electronic device of any one of Examples 1 to 5, the audio control unit is configured to selectively extract the audio stream further based on at least one among a location of the unmanned aerial vehicle, a location and an orientation of the electronic device, and a focal distance of the camera.

Example 7

In the electronic device of any one of Examples 1 to 6, the audio control unit is configured to adjust a gain of the audio stream based on a distance between the unmanned aerial vehicle and a location in a target scene associated with the video stream.

Example 8

In the electronic device of any one of Examples 1 to 7, the audio control unit is configured to adjust noise of the unmanned aerial vehicle in the video stream based on a distance between the unmanned aerial vehicle and the location in the target scene.

Example 9

In the electronic device of any one of Examples 1 to 8, the audio control unit is further configured to reduce a suppression level of the noise in the video stream and decrease the gain of the audio stream as the distance between the unmanned aerial vehicle and the target scene increases.

Example 10

In the electronic device of any one of Examples 1 to 9, the audio control unit is further configured to increase a suppression level of the noise in the video stream and increase the gain of the audio stream as the distance between the unmanned aerial vehicle and the target scene decreases.

Example 11

According to another aspect of the present disclosure, there is provided a method for generating video data in an electronic device, including: wirelessly receiving, by a communication unit, a video stream captured by a camera, wherein the camera is located in an unmanned aerial vehicle; receiving, by at least one sound sensor, an input sound stream; generating, by a processor, an audio stream associated with the video stream based on the input sound stream; and generating, by the processor, the video data based on the video stream and the audio stream.

Example 12

In the method of Example 11, the electronic device is configured to manually or automatically control the unmanned aerial vehicle.

Example 13

In the method of Example 11 or 12, generating the video data includes: synchronizing the video stream and the audio stream; and combining the synchronized video stream and audio stream to generate the video data.

Example 14

In the method of Examples 11 to 13, generating the audio stream includes: selectively extracting the audio stream from the input sound stream based on a direction of the camera in the unmanned aerial vehicle.

Example 15

In the method of Examples 11 to 14, selectively extracting the audio stream is further based on at least one of an orientation or a spatial arrangement of the at least one sound sensor in the electronic device.

Example 16

In the method of Examples 11 to 15, selectively extracting the audio stream is further based on at least one among a location of the unmanned aerial vehicle, a location and an orientation of the electronic device, and a focal distance of the camera.

Example 17

In the method of Examples 11 to 16, generating the audio stream comprises adjusting a gain of the audio stream based on a distance between the unmanned aerial vehicle and a location in a target scene associated with the video stream.

Example 18

In the method of Examples 11 to 17, further including: adjusting noise of the unmanned aerial vehicle in the video stream based on a distance between the unmanned aerial vehicle and the location in the target scene.

Example 19

In the method of Examples 11 to 18, a suppression level of the noise in the video stream is reduced and the gain of the audio stream is decreased as the distance between the unmanned aerial vehicle and the target scene increases.

Example 20

In the method of Examples 11 to 19, a suppression level of the noise in the video stream is increased and the gain of the audio stream is increased as the distance between the unmanned aerial vehicle and the target scene decreases.

Example 21

According to yet another aspect of the present disclosure, there is provided a non-transitory computer-readable storage medium including instructions causing at least one processor of an electronic device to perform operations of: wirelessly receiving, via a communication unit, a video stream captured by a camera, wherein the camera is located in an unmanned aerial vehicle; receiving, via at least one sound sensor, an input sound stream; generating an audio stream associated with the video stream based on the input sound stream; and generating the video data based on the video stream and the audio stream.

Example 22

In the non-transitory computer-readable storage medium of Example 21, the electronic device is configured to manually or automatically control the unmanned aerial vehicle.

Example 23

In the non-transitory computer-readable storage medium of Examples 21 or 22, generating the video data includes: synchronizing the video stream and the audio stream; and combining the synchronized video stream and audio stream to generate the video data.

Example 24

In the non-transitory computer-readable storage medium of Examples 21 to 23, generating the audio stream comprises selectively extracting the audio stream from the input sound stream based on a direction of the camera in the unmanned aerial vehicle.

Example 25

In the non-transitory computer-readable storage medium of Examples 21 to 24, selectively extracting the audio stream is further based on at least one of an orientation or a spatial arrangement of the at least one sound sensor in the electronic device.

Example 26

In the non-transitory computer-readable storage medium of Examples 21 to 25, selectively extracting the audio stream is further based on at least one among a location of the unmanned aerial vehicle, a location of an orientation of the electronic device, and a focal distance of the camera.

Example 27

In the non-transitory computer-readable storage medium of Examples 21 to 26, generating the audio stream comprises adjusting a gain of the audio stream based on a distance between the unmanned aerial vehicle and a location in a target scene associated with the video stream.

Example 28

In the non-transitory computer-readable storage medium of Examples 21 to 27, further including: adjusting noise of the unmanned aerial vehicle in the video stream based on a distance between the unmanned aerial vehicle and the location in the target scene.

Example 29

In the non-transitory computer-readable storage medium of Examples 21 to 28, a suppression level of the noise in the video stream is reduced and the gain of the audio stream is decreased as the distance between the unmanned aerial vehicle and the target scene increases.

Example 30

In the non-transitory computer-readable storage medium of Examples 21 to 29, a suppression level of the noise in the video stream is increased and the gain of the audio stream is increased as the distance between the unmanned aerial vehicle and the target scene decreases.

What is claimed:

1. An electronic device for generating video data, comprising:
communication circuitry configured to wirelessly receive a video stream captured by a camera, wherein the camera is located in an unmanned aerial vehicle;
at least one sound sensor configured to receive an input sound stream;
audio control circuitry configured to:
generate an audio stream associated with the video stream based on the input sound stream; and
adjust a gain applied to the audio stream to generate an adjusted audio stream, the gain adjusted based on a distance between the unmanned aerial vehicle and a location external to the unmanned aerial vehicle; and
synthesizer circuitry configured to generate the video data based on the video stream and the adjusted audio stream.

2. The electronic device of claim 1, wherein the electronic device comprises a controller configured to manually or automatically pilot the unmanned aerial vehicle, and wherein the location external to the unmanned aerial vehicle comprises a location in a target scene associated with the video stream.

3. The electronic device of claim 1, wherein the synthesizer circuitry comprises:
synchronization circuitry configured to synchronize the video stream and the adjusted audio stream to generate a synchronized video stream and a synchronized audio stream; and
combining circuitry configured to generate the video data based on the synchronized video stream and the synchronized audio stream.

4. The electronic device of claim 1, wherein the audio control circuitry is configured to selectively extract the audio stream from the input sound stream based on a direction of the camera in the unmanned aerial vehicle.

5. The electronic device of claim 4, wherein the audio control circuitry is configured to selectively extract the audio stream further based on at least one of an orientation or a spatial arrangement of the at least one sound sensor.

6. The electronic device of claim 1, wherein the communication circuitry is further configured to wirelessly receive one or more camera parameters and location information from the unmanned aerial vehicle, and wherein the audio control circuitry is further configured to selectively extract the audio stream from the input sound stream based on a location of the unmanned aerial vehicle indicated by the location information, a location or an orientation of the electronic device, and a focal distance of the camera, the focal distance of the camera included in the one or more camera parameters.

7. The electronic device of claim 1, wherein the video stream includes audio, and wherein the synthesizer circuitry is configured to generate the video data by combining the adjusted audio stream with the audio of the video stream.

8. The electronic device of claim 1, wherein the audio control circuitry is further configured to adjust, prior to generation of the video data, a level of noise suppression applied to audio of the video stream based on the distance.

9. The electronic device of claim 8, wherein the audio control circuitry is further configured to reduce the level of noise suppression applied to the audio of the video stream and to decrease the gain applied to the audio stream responsive to an increase in the distance.

10. The electronic device of claim 8, wherein the audio control circuitry is further configured to increase the level of noise suppression applied to the audio of the video stream and to increase the gain applied to the audio stream responsive to a decrease in the distance.

11. A method for generating video data in an electronic device, comprising:
wirelessly receiving, by communication circuitry, a video stream captured by a camera, wherein the camera is located in an unmanned aerial vehicle;
receiving, by at least one sound sensor, an input sound stream;

generating, by a processor, an audio stream associated with the video stream based on the input sound stream;

adjusting, by the processor, a gain applied to the audio stream to generate an adjusted audio stream, the gain adjusted based on a distance between the unmanned aerial vehicle and a location external to the unmanned aerial vehicle; and generating, by the processor, the video data based on the video stream and the adjusted audio stream.

12. The method of claim 11, further comprising sending one or more instructions from the communication circuitry to the unmanned aerial vehicle to manually or automatically control the unmanned aerial vehicle.

13. The method of claim 11, wherein generating the video data comprises:

synchronizing the video stream and the adjusted audio stream to generate a synchronized video stream and a synchronized audio stream; and combining the synchronized video stream and the synchronized audio stream to generate the video data.

14. The method of claim 11, wherein generating the audio stream comprises selectively extracting the audio stream from the input sound stream based on a direction of the camera in the unmanned aerial vehicle, an orientation of the at least one sound sensor in the electronic device, and a spatial arrangement of the at least one sound sensor in the electronic device.

15. The method of claim 11, further comprising wirelessly receiving, by the communications circuitry, one or more camera parameters and location information from the unmanned aerial vehicle, wherein generating the audio stream comprises selectively extracting the audio stream from the input sound stream based on a location of the unmanned aerial vehicle indicated by the location information, a location or an orientation of the electronic device, and a focal distance of the camera, the focal distance of the camera indicated by the one or more camera parameters.

16. The method of claim 11, wherein the video stream includes audio, and wherein generating the video data comprises combining the adjusted audio stream with the audio of the video stream.

17. The method of claim 11, further comprising, prior to generating the video data:

adjusting a level of noise suppression applied to audio of the video stream based on the distance.

18. The method of claim 17, wherein the level of noise suppression applied to the audio of the video stream is reduced and the gain applied to the audio stream is decreased responsive to an increase in the distance.

19. The method of claim 17, wherein the level of noise suppression applied to the audio of the video stream is increased and the gain applied to the audio stream is increased responsive to a decrease in the distance.

20. A non-transitory computer-readable storage medium comprising instructions causing at least one processor of an electronic device to perform operations of:

wirelessly receiving, via communication circuitry, a video stream captured by a camera and a camera parameter, wherein the camera is located in an unmanned aerial vehicle;

receiving, via at least one sound sensor, an input sound stream;

generating an audio stream associated with the video stream based on the input sound stream;

determining a distance between the unmanned aerial vehicle and a location external to the unmanned aerial vehicle based on the camera parameter;

adjusting a gain applied to the audio stream to generate an adjusted audio stream, the gain adjusted based on the distance between the unmanned aerial vehicle and the location external to the unmanned aerial vehicle; and generating video data based on the video stream and the adjusted audio stream.

21. The non-transitory computer-readable storage medium of claim 20, wherein generating the video data comprises:

synchronizing the video stream and the adjusted audio stream to generate a synchronized video stream and a synchronized audio stream; and combining the synchronized video stream and the synchronized audio stream to generate the video data.

22. The non-transitory computer-readable storage medium of claim 20, wherein generating the audio stream comprises selectively extracting the audio stream from the input sound stream based on a beamforming angle associated with the audio stream, the beamforming angle determined based on a direction of the camera in the unmanned aerial vehicle, location information of the unmanned aerial vehicle, and location information of the electronic device.

23. The non-transitory computer-readable storage medium of claim 22, wherein the beamforming angle is further determined based on at least one of an orientation or a spatial arrangement of the at least one sound sensor in the electronic device.

24. The non-transitory computer-readable storage medium of claim 20, wherein the operations further comprise wirelessly receiving, via the communication circuitry, one or more camera parameters, including the camera parameter, and location information from the unmanned aerial vehicle, and wherein generating the audio stream comprises selectively extracting the audio stream based on the location information, a location or an orientation of the electronic device, and the one or more camera parameters.

25. The non-transitory computer-readable storage medium of claim 20, wherein the video stream includes audio, and wherein generating the video data comprises combining the adjusted audio stream with the audio of the video stream, and wherein the operations further comprise adjusting a level of noise suppression applied to audio of the video stream based on the distance.

26. The non-transitory computer-readable storage medium of claim 20, wherein generating the video data based on the video stream and the adjusted audio stream is performed substantially in real time with receiving the video stream, and wherein the location external to the unmanned aerial vehicle corresponds to a center focus point of a target scene associated with the camera of the unmanned aerial vehicle.

27. The non-transitory computer-readable storage medium of claim 20, wherein the operations further comprise outputting the video data, wherein outputting the video data is performed substantially in real time with receiving the video stream.

28. The method of claim 11, further comprising:

wirelessly receiving, via the communication circuitry, a camera parameter from the unmanned aerial vehicle; and determining, by the processor, the distance between the unmanned aerial vehicle and the location external to the unmanned aerial vehicle based on a camera parameter of the unmanned aerial vehicle, wherein the location external to the unmanned aerial vehicle comprises a location in a target scene associated with the video stream.

29. The electronic device of claim 1, wherein the communication circuitry is further configured to wirelessly receive a camera parameter from the unmanned aerial vehicle, and wherein the audio control circuitry is further configured to determine the distance between the unmanned aerial vehicle and the external location based on the camera parameter of the unmanned aerial vehicle.

30. The electronic device of claim 29, wherein the camera parameter comprises a focal distance of the camera.

* * * * *